(No Model.)

T. W. RYAN.
FAUCET.

No. 584,897.                         Patented June 22, 1897.

WITNESSES.                                    INVENTOR.
Matthew M. Blunt,                        Thomas W. Ryan,
                                                By O. M. Shaw
                                                        ATT'Y.

UNITED STATES PATENT OFFICE.

THOMAS W. RYAN, OF CONCORD JUNCTION, MASSACHUSETTS.

FAUCET.

SPECIFICATION forming part of Letters Patent No. 584,897, dated June 22, 1897.

Application filed February 29, 1896. Serial No. 581,338. (No model.)

*To all whom it may concern:*

Be it known that I, THOMAS W. RYAN, of Concord Junction, in the county of Middlesex, State of Massachusetts, have made certain new and useful Improvements in Faucets, of which the following is a description sufficiently full, clear, and exact to enable any person skilled in the art or science to which said invention appertains to make and use the same, reference being had to the accompanying drawings, forming a part of this specification, in which—

Figure 1:
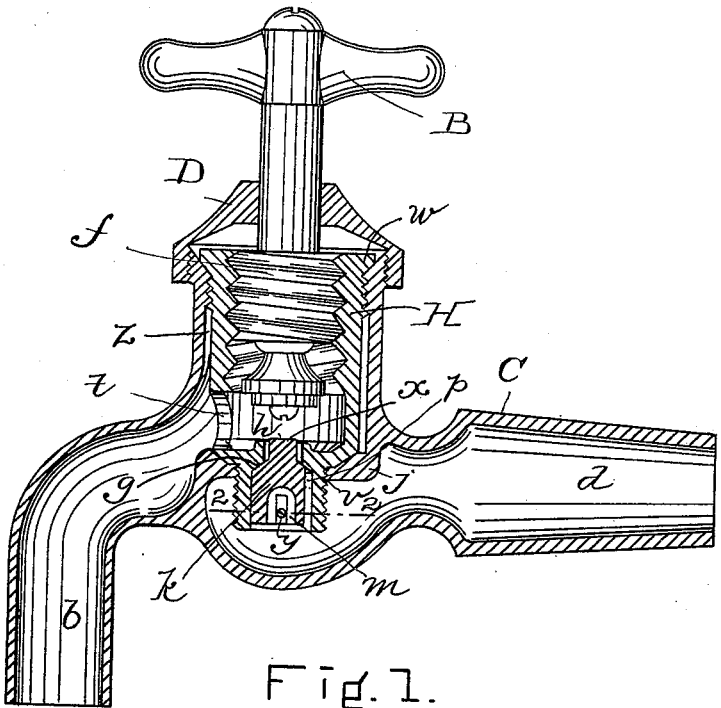
Figure 2:
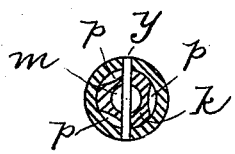

Figure 1 is a vertical longitudinal section of my improved faucet, and Fig. 2 a sectional view illustrating details.

Like letters of reference indicate corresponding parts in both figures of the drawings.

My invention relates especially to automatic pressure-actuated shut-offs for faucets, the object being to combine such construction with the ordinary shut-off that the valves may be made in a single casting or shell fitted in the outer casing.

The nature and operation of the improvement will be understood from the following explanation.

In the drawings, C represents the outer shell or casing, which is provided with an inlet $d$ and nose or outlet $b$, separated by a horizontally-arranged partition $j$, centrally tapped and screw-threaded at $v$. Above this opening the casing is extended vertically at $z$ and a tubular inner casing H is dropped therein, the surfaces being ground, so as to be steam or water tight. The head of this inner shell $w$ is squared to receive a wrench, and its lower end is reduced, forming an inwardly-opening valve-seat $g$, below which the shell is extended to form a threaded nipple, which is turned into the threaded opening $v$ in the partition $j$ and secures the shell in position in the casing. A valve $k$ is fitted to slide in this nipple and seats at $g$ therein. Said valve has a stem $x$ projecting into the casing and is prevented from dropping out from the nipple by a cross-pin $y$. The under side of the valve is hollowed at $m$, forming an air-chamber to prevent racking or vibration. The valve is also grooved vertically at $p$, the diameters of said grooves being equal to the mouth of the seat $g$, that the water-flow may not be decreased. The shell has an outlet $t$ registering with the casing-outlet. The upper end of said shell is interiorly screw-threaded to receive a compression-screw A, operated by a handle B. The lower end or head of the screw is in position to engage the stem $x$ of the valve $k$ at $h$ and depress said valve when the screw is turned inward. A cap D is turned onto the casing and prevents the screw from being turned out therefrom.

In the use of my invention by turning the screw A inward the automatic valve $k$ may be forced away from its seat, permitting the water to flow freely around said valve to the outlet $b$ of the casing. As soon as the screw A is turned out, the pressure of the water will seat the valve, or the valve $h$ on the head of the screw may be seated at $g$ to shut off the flow, and when said screw is turned out will still engage the stem $x$, holding the automatic valve $k$ open to permit the flow. By this construction the upper shut-off valve can be removed for any purpose without shutting the water off in the pipe. This construction can be applied to any form of faucet or cock.

Having thus explained my invention, what I claim is—

A faucet comprising a casing having a horizontal partition between its inlet and outlet; a threaded opening connecting said inlet and outlet through said partition; an opening, $z$, in the upper casing-wall vertically above the partition-opening; an interiorly-threaded shell removable through the casing-opening, $z$; an exteriorly-threaded nipple on the bottom of said shell and connected therewith by a valve-seat, $g$; a hollow valve in said nipple subject to water-pressure on the inlet side of the casing when said nipple has been turned into the partition-opening whereby said valve may be engaged with said seat; a stem on said valve projecting into the shell through said seat; a discharge-port in the shell registering with the outlet of said casing above said partition; and a screw-valve turned into said shell said screw-valve being adapted to be engaged with said stem to unseat the pressure-valve and turned into engagement with said seat, $g$, to close the same all being combined and arranged substantially in the manner shown.

THOMAS W. RYAN.

Witnesses:
 T. F. SHAUGHNESSY,
 M. J. FARRELL.